United States Patent [19]

Savins

[11] 4,067,389
[45] Jan. 10, 1978

[54] HYDRAULIC FRACTURING TECHNIQUE

[75] Inventor: Joseph George Savins, Dallas, Tex.

[73] Assignee: Mobil Oil Corporation, New York, N.Y.

[21] Appl. No.: 705,866

[22] Filed: July 16, 1976

[51] Int. Cl.$^2$ ............................................. E21B 43/26
[52] U.S. Cl. ................................... 166/246; 166/308; 166/300
[58] Field of Search ............... 166/246, 300, 308, 307, 166/281, 282, 283, 273–275, 271, 259; 252/8.55 A, 8.55 C, 8.5 C, 8.5 A

[56] References Cited

U.S. PATENT DOCUMENTS

| | | | |
|---|---|---|---|
| 3,153,450 | 10/1964 | Foster et al. | 166/283 |
| 3,251,768 | 5/1966 | Walker | 252/8.55 R |
| 3,305,016 | 2/1967 | Lindblom et al. | 166/246 |
| 3,319,715 | 5/1967 | Parks | 166/283 |
| 3,405,062 | 10/1968 | Kuhn | 166/283 X |
| 3,625,889 | 12/1971 | Branscum | 166/246 X |
| 3,760,881 | 9/1973 | Kiel | 166/308 |
| 3,765,918 | 10/1973 | Jordan et al. | 252/8.5 C X |
| 3,988,246 | 10/1976 | Hartfiel | 252/8.55 R X |

OTHER PUBLICATIONS

Kovacs, "Useful Incompatibility of Xanthan Gum with Galactomannans", Food Technology, vol. 27, No. 3, Mar. 1973, pp. 26–30.
Rees, "Shapely Polysaccharides", The Eighth Colworth Medal Lecture, Biochemical Journal, 1972, pp. 257–273.

*Primary Examiner*—Stephen J. Novosad
*Attorney, Agent, or Firm*—C. A. Huggett; Henry L. Ehrlich

[57] ABSTRACT

This specification discloses a technique of hydraulically fracturing a subterranean formation wherein there is used a fracturing fluid comprised of an aqueous solution of an interaction product of a polysaccharide and a galactomannan.

4 Claims, 1 Drawing Figure

EFFECT OF CONFORMATION CONVERSION—FROM INTERACTION BETWEEN XANTHAN GUM POLYSACCHARIDE AND LOCUST GUM GALACTOMANNAN — ON VISCOSITY YIELD IN DISTILLED WATER

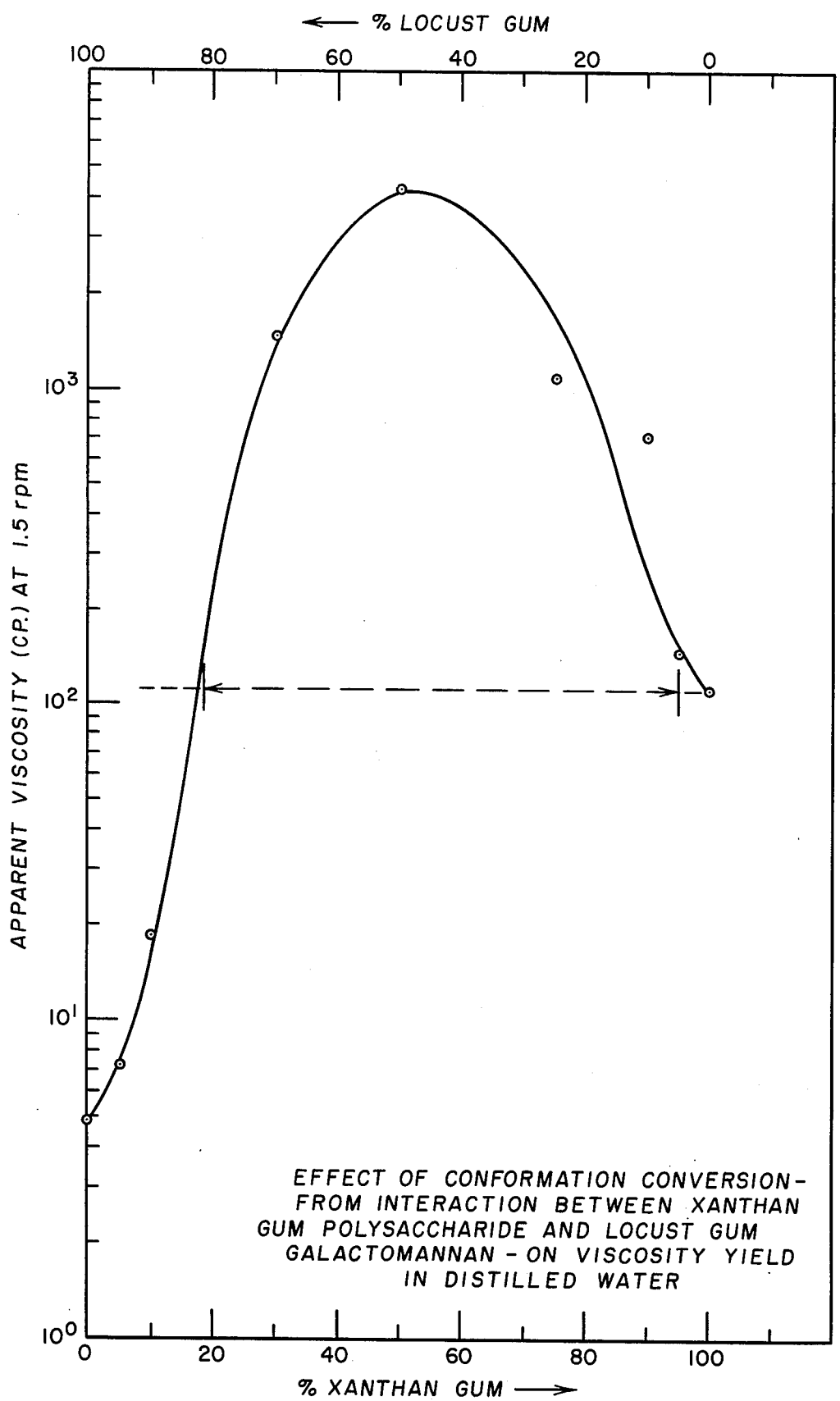
EFFECT OF CONFORMATION CONVERSION—FROM INTERACTION BETWEEN XANTHAN GUM POLYSACCHARIDE AND LOCUST GUM GALACTOMANNAN—ON VISCOSITY YIELD IN DISTILLED WATER

HYDRAULIC FRACTURING TECHNIQUE

BACKGROUND OF THE INVENTION

This invention is directed to a method of hydraulically fracturing a subterranean earth formation penetrated by a well and more particularly to using in a hydraulic fracturing technique an aqueous fracturing fluid comprised of a complex formed by the reaction of a polysaccharide and a galactomannan.

Hydraulic fracturing techniques have been widely used for stimulating wells penetrating subterranean hydrocarbon-bearing formations by creating fractures which extend from the wells into the formation. These techniques normally involve injecting a fracturing fluid down a well and into contact with the subterranean formation to be fractured. A sufficiently high pressure is applied to the fracturing fluid to initiate a fracture in the formation and the fracturing fluid is injected down the well at a sufficiently high rate to propagate the fracture thereinto. Propping materials are normally entrained in the fracturing fluid and are deposited in the fracture to maintain the fracture open.

Many different types of fracturing fluids have been employed. The evaluation of hydraulic properties of fracturing fluids is reviewed in an article, "What to Learn about Hydraulic Fracturing Fluids", T. C. Buchley and D. L. Lord, The Oil and Gas Journal, Sept. 17, 1973, pp. 84–88. Buchley et al. state that present-day fracturing fluids are classified as Newtonian, polymer solutions, crosslinked polymer solutions, emulsions, micellar solutions, and gelledorganic liquids in solution with a liquefied gas. They teach that a fracturing fluid should be compatible with both rock-matrix material and natural fluids contained within the matrix pores. Newtonian fluids are used infrequently as fracturing fluids because they produce large wellbore pressure drops. They are significant, however, because they are the main ingredients in the formulation of fracturing fluids. It is the addition of polymers and/or other components to water, oil, or alcohol which produces most present-day fracturing fluids.

With respect to crosslinked polymer solutions, Buchley et al. indicate that these have received more attention than other fracturing fluids in the past several years. In field preparation of crosslinked polymer solutions a water-base gel is first prepared by adding natural or synthetic polymer to the base fluid at a concentration of 40 to 80 lb/1000 gal. Next, an appropriate chemical is added to the thickened water-base gel to crosslink the polymer molecules. In field application the crosslinking agent is injected continuously at the surface as the gelled fluid is pumped downhole.

In a paper entitled "New Generation of Frac Fluids" by J. L. White and R. B. Bosene, presented at the 24th Annual Technical Meeting of the Petroleum Society of CIM in Edmonton, May 8–12, 1973, there is described new, very viscous frac fluids and low-damage fluids to improve well productivity. These fluids exhibit low friction pressure down tubular goods and high viscosity in the fracture and are low damaging and exhibit low fluid loss and positive gel breakdown. According to White et al. there are three basic materials used to prepare water-base thickened fluids: guar gum, cellulose derivatives, and a synthetic polymer. The high viscosity of these fluids is achieved either by crosslinking or using high concentrations of polymers that impart good viscosity and friction reducing properties. White et al. further teach that there are four viscous water-base fluids available which cover a wide temperature range. The four new fluids are a crosslinked guar gum, a crosslinked cellulose derivative, and two fluids using a high concentration of synthetic polymer. The crosslinked guar fluids develop higher viscosities than the other fluids but this high viscosity drops sharply at temperatures above 220° F.

White et al., in discussing the rheology of the thick frac fluids, point out that in the case of non-Newtonian fluids, the shear stress is not proportional to the shear rate and that the term "apparent viscosity" is applied to these fluids. This is the viscosity the fluid has at a specific shear rate. The apparent viscosity is the ratio of shear stress to shear rate. The apparent viscosities at fracture shear rates for the gels described in the paper were experimentally determined using a high temperature, high pressure Fann Viscosimeter, Model 50.

It is generally recognized that the term "non-Newtonian" fluid generally implies that the fluid is nonlinear in the sense that the viscous resistance of the fluid is a function of shear rate versus shear stress.

In the paper entitled "Polysaccharide Derivatives Provide High Viscosity and Low Friction at Low Surface Fluid Temperatures", by J. L. White and J. O. Means, *Journal of Petroleum Technology,* September 1975, pp. 1067–1073, reference is made to low-residue polysaccharide derivatives that achieve high viscosity and low friction levels much more rapidly than conventional thickeners.

In U.S. Pat. No. 3,710,865 there is described a fracturing method wherein an oil-in-water emulsion is used as a fracturing fluid. The emulsion contains a major volume proportion of an internal liquid hydrocarbon phase. The water phase comprises an aqueous polymer solution having a viscosity of at least 10 centipoises and preferably between 10 and about 100 centipoises at 70° F. and a shear rate of 511 reciprocal seconds. The aqueous polymer solution can be prepared by adding water-soluble polymeric thickening agent to the water prior to mixing the water and oil phases together. The polymeric thickening agent can be any one of a variety of long-chain, water-soluble polymers capable of building the viscosity of an aqueous solution. These polymers are commonly referred to as gums. Synthetic and modified polymers and natural gums can be used. Natural gums include guar gum, gum arabic, gum tragacanth, gum karaya, and the like. Also usable are the microbial fermentation gums such as dextran and the heteropolysaccharides produced by the bacteria of the genus Xanthomonas. The synthetic and modified polymers include the acrylic polymers such as polyacrylamide and polyacrylic acid; the vinyl polymers such as polyvinylpyrrolidone and polyvinylcarboxylic acid neutralized with a long-chain amine and a common base; and the cellulose derivatives such as sodium carboxymethylcellulose, sodium carboxymethylhydroxyethylcellulose, methylcellulose, hydroxyethylcellulose, and ethylhydroxyethylcellulose. In some applications it may be desirable to use both natural and synthetic polymers since their respective chemical effects on the emulsion may be different.

In U.S. Pat. No. 3,760,881, there is described a method of treating a subterranean formation surrounding a wellbore by injecting into the formation a water-based viscous fluid containing a complex produced by the reaction of an aliphatic quaternary ammonium compound with a water-soluble compound selected from the group consisting of monosaccharides, disaccharides, trisaccharides, polysaccharides, and long-chain synthetic hydroxylated polymers which yield such complexes at a temperature between about 20° C. and about 205° C. or higher. Complexes prepared by the reaction of long-chain quaternary ammonium halides with high molecular water-soluble polysaccharides such as guar gum or a similar galactomannan are particularly effective for purposes of the invention. Water-soluble polysaccharides of vegetable, animal or microbial origin, including both the structural and nutrient types are suitable for use. Among the examples given of suitable water-soluble polysaccharides are galactomannans, natural gums such as gum karaya, gum tragacanth, and the like, and polysaccharides produced by bacteria of the genus Xanthomonas.

In U.S. Pat. No. 3,483,121 there is described an aqueous fracturing solution that contains a hydroxyalkyl ether of a galactomannan gum having a degree of substitution of 0.1–5.0. The hydroxyalkyl galactomannan gums are made by reacting galactomannan gums such as guar gum and locust bean gum with an alkylene oxide having at least two and preferably three or more carbon atoms.

In U.S. Pat. No. 3,768,566 there is described a fracturing fluid comprising an aqueous fluid having a pH of less than 7, a water-soluble alcohol, and a crosslinked polysaccharide. A method is described whereby the viscosity of a fluid is increased at a time when the fluid is being subjected to temperature which tends to reduce the initial viscosity of the fluid. The viscosity is increased by the hydration of an additive which is a polysaccharide that has been crosslinked such that the polysaccharide's hydration rate is greatly retarded at temperatures below about 100° F. but which may be hydrated at temperatures above 140° F. The viscosity increasing additive is a hydratable polysaccharide crosslinked with a compound selected from the group consisting of dialdehydes having the general formula OHC(CH$_2$)$_n$CHO, wherein $n$ is an integer within the range of 0 to about 3.

Polysaccharides useful for forming the retarded gelling agent are hydratable polysaccharides having a molecular weight of at least about 100,000. Suitable hydratable polysaccharides are hydratable galactomannan gums, hydratable glucomannan gums and hydratable cellulose derivatives. Examples of suitable hydratable polysaccharides are guar gum, locust bean gum, karaya gum, carboxymethylcellulose, carboxymethylhydroxyethylcellulose and hydroxyethylcellulose.

In an article entitled "Shapely Polysaccharides" by D. A. Rees, *Biochemical Journal*, Vol. 126, 1972, pp. 257–273, it is said that the Xanthomonas polysaccharide does not form gels by itself, but, when mixed with locust bean galactomannan, which also does not gel alone, a stiff rubber gel can be formed.

In an article, entitled "Useful Incompatibility of Xanthan Gum with Galactomannans", Peter Kovacs, *Food Technology*, Vol. 27, No. 3, March 1973, pp. 26–30, it is said that one of the most useful incompatibilities is the reaction of xanthan gum with galactomannans, such as locust bean gum and guar gum. When xanthan gum is combined with guar gum, a synergistic increase in viscosity occurs; in most cases this increase is not dramatic. However, when xanthan gum is combined with locust bean gum, a highly significant viscosity increase occurs at low concentrations, and as the colloid concentration is increased, a thermoreversible and highly cohesive gel is obtained. It is further said that maximum gel strengths are obtained with xanthan gum: locust bean gum ratios in the range of 6:4 to 4:6.

SUMMARY OF THE INVENTION

This invention is directed to a method of fracturing a subterranean formation penetrated by a well wherein a fracturing fluid is injected into the formation, which fracturing fluid is comprised of an aqueous mixture of a microbial polysaccharide and a galactomannan gum.

BRIEF DESCRIPTION OF THE DRAWING

The drawing is a graph showing the relationship of apparent viscosity and concentration of an aqueous mixture of the reaction products of xanthan gum polysaccharide and locust gum galactomannan.

DESCRIPTION OF THE PREFERRED EMBODIMENTS

This invention is directed to a technique for fracturing a subterranean earth formation penetrated by a well wherein a fracturing fluid comprised of an aqueous mixture of a reaction product of a microbial polysaccharide or heteropolysaccharide and a galactomannan is injected down the well and into the formation under sufficiently high hydraulic pressure and at a sufficiently high rate to form and propagate a fracture into the formation. Additives may be included in the fracturing fluid. For example, propping agents would normally be included in the fracturing fluid as might additives which would serve to "break" or reduce the viscosity of the fracturing fluid after a period of time. Salts, for example sodium chloride, calcium chloride, and chromium chloride may be included as "breakers".

Galactomannans which are most effective in forming gels on interacting mixtures thereof with other polysaccharides are those that have low proportions of galactose residues. Satisfactory galactomannans include locust bean gum and guar gum. Locust bean gum or carob bean gum is obtained from the locust or carob fruit, see *Gum Technology in the Food Industry*, Chapter 5, Martin Glicksman, Academic Press, Inc., New York, 1969. Locust bean gum is a galactomannan polysaccharide with a molecular weight of about 310,000. The structure is essentially a straight D-mannose polymer linked carbon No. 1 to carbon No. 4 with relatively regular branching on every fourth or fifth mannose group on carbon No. 6 by single D-galactose units. Locust bean gum has been used in fracturing fluids and such use is described in the above-mentioned U.S. Pat. No. 3,768,566 and U.S. Pat. No. 3,483,121. Locust bean gum is available commercially from several sources including Meer Corporation, 9500 Railroad Avenue, North Bergen, N.J. 07047.

Polysaccharides that are effective in forming gels on interacting with the galactomannans are polysaccharides produced by baceteria of the genus Xanthomonas, which polysaccharides have been employed in oil field operations in various mobility control applications in waterflood oil recovery processes. Such polysaccharides and the methods of preparation and use are well known to those skilled in the art as disclosed, for example, in U.S. Pat. No. 3,801,502 to Hitzman and U.S. Pat. No. 3,908,760 to Clampitt et al. Representative species of the genus Xanthomonas which may be employed to produce polysaccharides include *Xanthomonas bego-* niae, Xanthomonas campestris, Xanthomonas carotae, Xanthomonas corylina, Xanthomonas gummisudans, Xanthomonas hederae, Xanthomonas incanae, Xanthomonas lespedezae, Xanthomonas malvacearum, Xanthomonas holcicola, Xanthomonas papavericola, Xanthomonas phaseoli, Xanthomonas pisi, Xanthomonas translucens, Xanthomonas vasculorum and Xanthomonas vesicatoria. A particular polysaccharide which is commercially available and is preferred for use in the present invention is the anionic polysaccharide B-1459 produced by fermentation of glucose with the bacterium Xanthomonas campestris NRRL B-1459 USDA. This polysaccharide is produced by culturing the bacterium Xanthomonas campestris in a well aerated medium having a pH of about 7 and which contains commercial glucose, organic nitrogen sources, dipotassium hydrogen phosphate, and appropriate trace elements. This polymer is known as xanthan gum and is available from a number of sources including the Kelco Company (a division of Merck Incorporated) under the trade name "Kelzan". Another source of a Xanthomonas polysaccharide is Pfizer, Inc. where there is available a Xanthomonas based broth under the trade name of "Biopolymer 1035" and a recovered gum under the trade name of "Biopolymer 1500".

Laboratory experimental work was carried out using as the polysaccharide, xanthan gum, a composition produced by the fermentation of carbohydrates with organisms of the genus Xanthomonas and the galactomannan, locust bean gum, derived from the seeds of Ceratonia siliqua, known as St. John's bread. The results of this experimental work indicate that a fracturing fluid suitable for use in fracturing subterranean formations may be formed by mixing the polysaccharide produced by bacteria of the genus Xanthomonas, hereafter referred to as "xanthan gum" and galactomannan obtained from locust bean gum, hereafter referred to as "locust gum", in the ratio varying within the range of about 20 percent xanthan gum and 80 percent locust gum to about 95 percent xanthan gum and 5 percent locust gum, and more preferably mixing the xanthan gum and locust gum in about equal amounts. The xanthan gum and locust gum should be present in an amount sufficient to impart a desired apparent viscosity to the fracturing fluid. In general, higher apparent viscosity fracturing fluids better support propping materials and create wider fractures but require higher pumping pressures and larger volumes of fracturing fluid for the same length of fracture that would be created with a lower apparent viscosity fracturing fluid. Lower apparent viscosity fracturing fluids are generally cheaper than higher apparent viscosity fluids and create more length of fracture and thus expose more surface area of formation to the created fracture per unit volume of fracturing fluid injected. Thus, the desired apparent viscosity of a fracturing fluid will vary depending upon the desired characteristics of the fracturing fluid. In general the desired apparent viscosity of a fracturing fluid at ambient surface temperatures will be no greater than about 300 centipoises as determined using the Fann Viscosimeter in accordance with recognized practices. Such practices as recommended by the American Petroleum Institute are set out in "Recommended Practice, Standard Procedure for the Evaluation of Hydraulic Fracturing Fluids", API RP 39, First Edition, July 1960, reissued September 1966.

Turning now to the FIGURE there is shown a plot of xanthan gum-locust gum concentration in percent versus apparent viscosity in centipoises at 77° F. as measured at 1.5 rpm with a Brookfield viscometer equipped with a UL adapter. Preparation of stock solutions of the polymers used in obtaining the data of the FIGURE involved the following procedure. The xanthan gum was dispersed in distilled water to form a stock solution that contained 2000 weight parts per million of xanthan gum and the stock solution was agitated for a period of 72 hours at 25° C. to ensure complete dispersion. The locust gum stock solution was formed by dispersing locust gum in distilled water at 25° C. in an amount to form a solution containing 2000 wppm locust gum, raising the temperature to 80° C. and holding at this temperature for one hour and then cooling to 25° C. During the heat/cool cycle the stock solution was continuously sheared. This protocol was then followed by a period of agitation for 72 hours at 25° C. to ensure that dispersion was complete. As will be demonstrated later the apparent viscosities depend upon the preparation procedure. The data from which this FIGURE was plotted is shown in Table I and was obtained using between 0 and 1000 wppm xanthan gum and between 0 and 1000 wppm locust gum. For the point obtained for 0 percent xanthan gum, the concentration of locust gum is 1000 wppm and results in an apparent viscosity of about 5 centipoises. Likewise, the point for 100 percent xanthan gum is obtained from a solution of 1000 wppm of xanthan gum in distilled water and results in an apparent viscosity of about 112 centipoises. The 50 percent point of xanthan gum and locust gum is obtained at a total polymer concentration of 1000 wppm and the resulting apparent viscosity is about 4300 centipoises.

TABLE I
APPARENT VISCOSITY OF XANTHAN GUM-LOCUST GUM MIXTURES

| Xanthan Gum, wppm | Locust Gum, wppm | Total wppm | Apparent Viscosity cp at 1.5 rpm |
|---|---|---|---|
| 1000 | 0 | 1000 | 112 |
| 950 | 50 | 1000 | 144 |
| 900 | 100 | 1000 | 710 |
| 750 | 250 | 1000 | 1091 |
| 500 | 500 | 1000 | 4307 |
| 250 | 750 | 1000 | 1477 |
| 100 | 900 | 1000 | 18.4 |
| 50 | 950 | 1000 | 7.2 |
| 0 | 1000 | 1000 | 4.8 |

The time dependency of the apparent viscosity at 1.7 sec$^{-1}$ obtained by the mixed polysaccharide complex in distilled water is shown in the data presented in Table II. Here the xanthan gum content is fixed at 500 wppm and locust gum content is varied from 0 up to 500 wppm. The "relative viscosity" of the complex is shown immediately after preparation and 24 hours later. This data shows a precipitous loss in relative viscosity for an aging period of 24 hours.

TABLE II
RHEOSYNERGISTIC EFFECTS IN XANTHAN GUM-LOCUST GUM SYSTEMS

| Solution No. | Xanthan Gum (wppm) | Locust Gum (wppm) | Relative Viscosity t = 0 | t = 24 hrs |
|---|---|---|---|---|
| 1 | 500 | 0 | 1.0* | 1.0 |
| 2 | 500 | 50 | 3.9 | 1.6 |
| 3 | 500 | 100 | 9.7 | 2.0 |
| 4 | 500 | 150 | 14.2 | 2.3 |
| 5 | 500 | 200 | 20.7 | 3.2 |
| 6 | 500 | 250 | 28.9 | 3.8 |
| 7 | 500 | 300 | 37.1 | 3.9 |
| 8 | 500 | 400 | 48. | 4.9 |
| 9 | 500 | 500 | 58.5 | 6.1 |

*Xanthan gum apparent viscosity (1.7 sec$^{-1}$) is 25 cp.

The term "relative viscosity" may be defined as the ratio of the apparent viscosity of a polysaccharide mixture complex to the apparent viscosity of a reference complex and as used herein means the ratio of the apparent viscosity of the xanthan gum-locust gum complex to the apparent viscosity of a 500 wppm xanthan gum solution, both evaluated at a shear rate of about 1.7 sec$^{-1}$.

The observed feature of viscosity degradation is a desirable characteristic for a frac fluid as this permits the well to be cleaned up rapidly with minimum material retained by the formation after the frac treatment. In connection with the equally important feature of controlled viscosity breakdown, it has been observed that the mixed polysaccharide complexes will break by design on response to an alteration in electrolyte environment. The rate of degradation depends upon the ionic environment when the complex is formulated. For example, a complex consisting of equal parts by weight of xanthan gum and locust gum and a total polymer concentration of 500 wppm exhibited, after a certain period of time, an apparent viscosity of 6927 centipoises. Subsequent addition of a mixture of sodium chloride (NaCl) and calcium chloride (CaCl$_2$) in the amounts of 3 percent (weight) and 0.15 percent (weight), respectively, caused an immediate degradation of viscosity to a level on the order of 9 centipoises. Depending upon the desired gel life, different breaking times can be controlled through changes in concentration of either or both of these salts.

These mixed polymer complexes may be prepared by mixing together separately prepared stock solutions of each component as earlier described in the discussion of the stock solutions used in obtaining the data of the FIGURE. Inhibited with bactericides and oxygen scavenger, these relatively low viscosity stocks should remain stable for extended periods of time. Alternatively, the final complex compositions can be prepared from a homogenous blend of the dry components and the final gel complex achieved gradually. For example, a 500 wppm solution containing 250 wppm each of xanthan gum and locust gums was prepared by dry blending the polymers to form an intimate mix and then dispersing the solids into the aqueous phase under conditions such that uniform mixing conditions were achieved and the water temperature did not exceed 25° C. Within 15 minutes the apparent viscosity of the complex was on the order of 60 centipoises. That this was the equilibrium viscosity at 25° C. was verified by the obtention of practically the same viscosity 30 minutes and 60 minutes after preparation. This solution was then heated to 80° C., held at this temperature for 30 minutes, quick-cooled to 25° C. and an aliquot then transferred to the viscometer where a viscosity of 8707 centipoises was recorded.

In accordance with an embodiment of this invention, the fracturing fluid is formed by mixing xanthan gum and locust gum in an aqueous mixture and heating the mixture to a temperature of at least 77° F. The heating of the aqueous solution is considered to favor the forming of a polysaccharide complex and results in the reaction product of the xanthan gum and locust gum having a greater apparent viscosity than it would otherwise have.

In accordance with another embodiment of this invention, a formation that is penetrated by a well is fractured by injecting a fracturing fluid down the well and into the formation under sufficient pressure to form and propagate a fracture into the formation, which fracturing fluid is comprised of an aqueous mixture of a reaction product of a microbial polysaccharide produced by the bacterial action of the genus Xanthomonas and a galactomannan gum obtained from locust bean gum. Thereafter, an aqueous solution of a halide salt is injected down the well and into the formation and fracture in a sufficient volume to overflush the fracture and thereby contact and mix the halide salt with a substantial portion of the fracturing fluid remaining in the fracture. The halide salt, upon mixing with the fracturing fluid, breaks or reduces the viscosity of the fracturing fluid and thus facilitates the backflushing of the fracturing fluid from the fracture and surrounding formation into the well. After overflushing the fracture with the halide salt, the pressure on the well is reduced to allow the fracturing fluid to flow from the formation into the well and thus clean up the fracture and surrounding formation. Preferred halide salts are sodium chloride and calcium chloride and mixtures thereof because of their ready availability and low cost. Another preferred halide salt is chromium chloride which very rapidly breaks the viscosity of the fracturing fluid.

Experimental work was carried out with a gelled 500 wppm solution (250 wppm locust gum, 250 wppm xanthan gum) which work illustrates the breaking effect of various combinations of halide salts upon an aqueous solution of a reaction product of xanthan gum and locust gum. The results of this experimental work are presented in the Table III and illustrate the viscosity breaking action which is achieved. There the aqueous solution of the gel formed as the reaction product of xanthan gum and locust gum has an apparent viscosity as determined with the Brookfield viscometer at 1.7 sec$^{-1}$ of 1800 centipoises. The addition of 30,000 wppm of NaCl to the aqueous solution of the gel reduces the viscosity to 7.2 cp; the addition of 1500 wppm of CaCl$_2$ reduces the viscosity to 11.6 cp; and the addition of 50 wppm of CrCl$_3$ reduces the viscosity to 10 cp. From this it is seen that CrCl$_3$ is the most effective followed by CaCl$_2$ and NaCl in reducing the viscosity of the gel.

TABLE III

EFFECT OF HALIDE SALT ON APPARENT VISCOSITY OF AQUEOUS SOLUTION OF XANTHAN GUM AND LOCUST GUM

| Halide Salt X | Amount of Salt wppm-X | Apparent Viscosity of Xanthan Gum-Locust Gum Solution Viscosity (at 1.7 sec$^{-1}$), cp |
|---|---|---|
|  | 0 | 1,800 |
| CrCl$_3$ | 50 | 10 |
| CaCl$_2$ | 1,500 | 11.6 |
| NaCl | 30,000 | 7.2 |

Experimental work was carried out which work illustrates the effect of heating a mixture of locust gum and xanthan gum at different temperatures. The results shown in Table IV illustrate the effect of temperature on the viscosity of the mixture. An aqueous mixture of 250 wppm of xanthan gum and 250 wppm of locust gum was heated to different temperatures cooled for 45 minutes in a refrigerator and then the apparent viscosity was measured at several shear rates using the Brookfield viscometer. In Table IV the data is shown that was obtained at 1.7 sec$^{-1}$ immediately after preparation.

TABLE IV
EFFECT OF HEATING ON VISCOSITY OF AN AQUEOUS MIXTURE OF XANTHAN GUM AND LOCUST GUM

| Heat Level °F. | Apparent Viscosity cp at 1.7 sec$^{-1}$ |
|---|---|
| 77 | 68* |
| 100 | 80 |
| 120 | 600 |
| 140 | 1830 |
| 168 | 1800 |

*The viscosity of the mixture at 77° F. exceeds the algebraic sum of the individual viscosities of 250 wppm xanthan gum and 250 wppm locust gum solution In accordance with still another embodiment, a fracturing fluid is formed by mixing xanthan gum in the fermentate ("beer" or "in-vivo") form with locust gum in an aqueous mixture and heating the mixture. Experimental work was carried out with a fermentate supplied by Pfizer Inc. under under the trade name of "Biopolymer 1035". Biopolymer 1035 is a Xanthomonas based broth (equivalent to 1.5 percent xanthan) which was developed by Pfizer for use as a mobility control agent in enhanced oil recovery. In carrying out this work, 15.24 grams of the Biopolymer 1035 (equivalent to 0.25 gram of xanthan gum) was mixed with 500 grams of distilled water. Separately, 0.25 gram of locust gum was dispersed in 484.51 grams of distilled water. These systems were then combined and the viscosity of the mixture was measured before heating. The mixture was then heated to about 170° F. and held at this temperature for thirty minutes. It was then quick-cooled and the viscosity again measured. The viscosities of the mixture before and after heating are shown in Table V.

TABLE V
EFFECT OF HEATING ON VISCOSITY OF A MIXTURE OF XANTHAN GUM FERMENTATE AND LOCUST GUM

| Shear Rate (sec$^{-1}$) | Mixture Viscosity, cp |
|---|---|
| Before heating 1.7 | 30.0 |
| After heating 1.7 | 1300.0 |

Further experimental work was carried out to define the gelling action obtainable at lower polymer concentrations. This experimental work indicates that a fracturing fluid formulated to have a total polymer concentration of about 125 wppm would have a viscosity of about 180 centipoises. As previously indicated, it is desirable many times to use a fracturing fluid having a much lower viscosity. The data shown in Table VI illustrates that a fracturing fluid having a total polymer concentration on the order of 500 wppm may have a viscosity of about 2400 centipoises; a fracturing fluid having a total polymer concentration of 250 wppm may have a viscosity on the order of 800 centipoises, and a fracturing fluid having a total polymer concentration of 125 wppm may have a viscosity of about 180 centipoises. From this it can be seen that a fracturing fluid may be formulated with a total polymer concentration of as low as about 50 wppm and have desirable viscosity characteristics.

TABLE VI
POLYMER CONCENTRATION VISCOSITY RELATIONSHIP

| Polymer concentration, wppm | Apparent Viscosity, cp at 1.7 sec$^{-1}$ |
|---|---|
| 500 | 2400 |
| 250 | 800 |
| 125 | 180 |

I claim:

1. A method of fracturing a subterranean formation penetrated by a well, comprising:
   a. injecting down said well and into said formation at a pressure sufficient to fracture said formation a fracturing fluid comprised of a reaction product of an aqueous mixture of a microbial polysaccharide produced by the bacterial action of the genus Xanthomonas and a galactomannan gum obtained from locust bean gum;
   b. thereafter injecting down said well and into said formation and fracture, an aqueous solution of a halide salt to contact said halide salt and said fracturing fluid and reduce the viscosity of said fracturing fluid; and
   c. backflowing said fracturing fluid and halide salt from said formation and fracture into said well.

2. The method of claim 1 wherein said microbial polysaccharide and said galactomannan gum are present in said fracturing fluid in a ratio within the range of about 20 percent microbial polysaccharide and 80 percent galactomannan gum to about 95 percent microbial polysaccharide and 5 percent galactomannan gum.

3. The method of claim 2 wherein said microbial polysaccharide and said galactomannan gum are present in about equal amounts.

4. In a method of hydraulically fracturing a subterranean formation penetrated by a well wherein there is injected down the well and into the formation a fracturing fluid under sufficient pressure to form and propagate a fracture into the formation, the improvement comprising:
   a. forming an aqueous mixture of a microbial polysaccharide produced by the bacterial action of the genus Xanthomonas and a galactomannan gum obtained from locust bean gum wherein said microbial polysaccharide and said galactomannan gum are present within the range of about 20 percent microbial polysaccharide and 80 percent galactomannan gum to about 95 percent microbial polysaccharide and 5 percent galactomannan gum; and
   b. heating said aqueous mixture of microbial polysaccharide and galactomannan gum to a temperature of at least 77° F. to form said fracturing fluid.

* * * * *